United States Patent [19]

Duffee et al.

[11] Patent Number: 5,290,047

[45] Date of Patent: Mar. 1, 1994

[54] BEARING PROTECTION DEVICE

[75] Inventors: Henry S. K. Duffee, Florence; Denise M. Ard, Latta, both of S.C.

[73] Assignee: Five Star Seal Corporation, Florence, S.C.

[21] Appl. No.: 917,715

[22] Filed: Jul. 24, 1992

[51] Int. Cl.5 .............................................. F16J 15/18
[52] U.S. Cl. ...,.................................... 277/53; 277/55
[58] Field of Search ..................... 277/53, 55, 56, 57, 277/35, 36, 37; 384/480

[56] References Cited

U.S. PATENT DOCUMENTS

| | | | |
|---|---|---|---|
| 4,022,479 | 5/1977 | Orlowski . | |
| 4,114,902 | 9/1978 | Orlowski . | |
| 4,466,620 | 8/1984 | Orlowski . | |
| 4,484,754 | 11/1984 | Ballard . | |
| 4,572,517 | 2/1986 | Rockwood et al. . | |
| 4,576,383 | 3/1986 | Ballard . | |
| 4,630,458 | 12/1986 | Kakabaker | 277/56 |
| 4,706,968 | 11/1987 | Orlowski . | |
| 4,743,034 | 5/1988 | Kakabaker et al. | 277/56 |
| 4,852,890 | 8/1989 | Borowski | 277/39 |
| 4,983,303 | 1/1991 | Matsushima et al. | 277/35 |
| 5,024,451 | 6/1991 | Barowski | 277/57 |

OTHER PUBLICATIONS

Bearing Isolators by Inpro/Seal, By: Division of Inpro Companies, Inc. No Date Available.
The Garlock Equalizer Seal, By: Garlock, Inc., 1990 No Month Available.
Chesterton Labyrinth Seal, By: A. W. Chesterton Co., 1985 no month available.
Chesterton Labyrinth Seal, By: A. W. Chesterton Co., 1985 No Month Available.

*Primary Examiner*—William A. Cuchlinski, Jr.
*Assistant Examiner*—Daniel G. DePumpo
*Attorney, Agent, or Firm*—Jacobson, Price, Holman & Stern

[57] ABSTRACT

A bearing protector is provided for forming a seal between a rotating shaft and a housing opening outwardly through which the shaft projects. The protector comprises a component consisting of a plurality of preassembled components and is constructed in a manner such that it may be pressed fitted into operative association with a rotating shaft and a corresponding housing portion independent of any flexure of the protector parts which deters the sealing ability thereof.

8 Claims, 2 Drawing Sheets

BEARING PROTECTION DEVICE

BACKGROUND OF THE INVENTION

1. Field of the Invention

The present invention relates to a seal structure to be used in conjunction with a rotary shaft journaled from and projecting outwardly through an opening formed in a housing portion. The seal structure is operative to prevent solid contaminants as well as fluid contaminants from reaching a shaft bearing inwardly of the seal structure. Further, the seal structure also serves to prevent the loss of liquids within the housing portion inwardly of the seal structure to the outside environment.

2. Description of Related Art

Many varied designs of devices have been manufactured to prevent the loss of lubricant from bearing housings. The loss of lubricant leads to premature bearing failure and the most common devices used to prevent lubricant loss are termed "lip seals" of various styles.

As the lip of these seals is in contact with the rotating shaft, wear occurs on both the shaft and the lip. This allows lubricant to be lost and, in addition, allows outside contaminants to enter the bearing housing. These contaminants lead to premature bearing failure.

Many industries would prefer to replace these lip seals with some other type of seal which does not wear out as quickly as a lip seal.

Several types of devices have been manufactured by different manufacturers. Some of these devices work fairly well in preventing entry of contaminants as long as the shaft is rotating, thus centrifugal force is a key requirement for these types of designs. Inasmuch as most equipment does not operate 24 hours each day for 365 days of the year, few, if any, previous designs actually prevent entry of contaminants when the equipment has been shutdown and remains idle for any period of time.

Also, only a few of the previous designs of seals actually prevent loss of lubricant.

Many of the lip seals and other previous designed devices are installed in equipment (such as certain types of pumps) wherein the equipment is occasionally shutdown, and the associated shaft is adjusted axially to compensate for wear of some components such as an impeller. Many of these previous design devices are installed as two or more parts, and these parts will separate when the shaft is adjusted axially (or if the shaft moves axially due to changing thrust loads on the equipment).

Many of the previous designs of seals rely solely upon a basic labyrinth seal to be formed with the rotating shaft. Under sized shafts cause the labyrinth clearance to exceed this design tolerance, resulting in leakage proportional to the amount of excess clearance.

The main object of this invention is to provide a bearing protector type of seal which provides means to prevent entry of contaminants into the housing both when the shaft is rotating and the when the shaft is not rotating.

A further important object of this invention to provide a shaft bearing seal which also will be operative to prevent loss of lubricant or other liquids from within the housing when the associated shaft is rotating and also when the associated shaft is stationary.

Yet another very important object of this invention is to provide a shaft seal in accordance with the preceding objects and which also will be effective to maintain the desired seal even though the associated shaft shifts axially relative to the associated housing portion from which the seal is supported.

A final object of this invention to be specifically enumerated herein is to provide a shaft seal in accordance with the preceding objects and which will conform to conventional forms manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
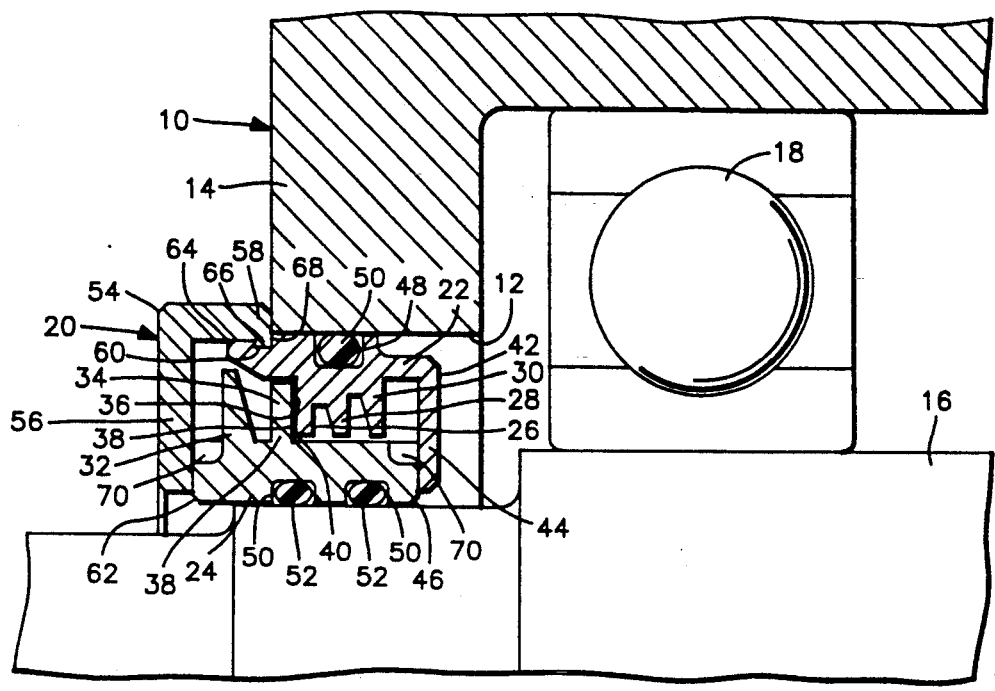
FIG. 1 is a fragmentary vertical sectional view illustrating the upper half of a seal constructed in accordance with the present invention in operative association with a housing portion opening, a rotary shaft projecting through the housing portion opening and a bearing journaling the shaft from the housing portion and wherein the shaft includes a stepped outer end portion.

Referring now more specifically to the drawings the numeral 10 generally designates a housing portion having a shaft opening 12 formed through one wall portion 14. A shaft 16 is journaled from the housing portion 14 through the utilization of bearing(s) 18 and the seal structure or bearing protector of the instant invention is referred in general by the reference numeral 20.

The seal structure 20 includes outer and inner stator and rotor components 22 and 24 which are rotatable relative to each other. The stator component 22 includes three axially spaced inwardly projecting fins 26, 28 and 30 extending circumferentially about and projecting inwardly from the inner periphery of the stator component 22 generally intermediate its opposite axial ends and defining V-shaped voids 25 therebetween the rotor component 24 includes a plurality of outer peripheral, circumferentially extending and generally radially outwardly projecting fins 32 and 34 defining a V-shaped void 33 therebetween. The fins 26 and 34 include opposing axial end faces 36 and 38 normal to the coinciding center axes of the stator and rotor components 22 and 24 and between which a minimum gap space 40 is defined. Actually, when the seal assembly 20 is new and just installed, the end faces 36 and 38 may lightly touch each other.

In addition, the inner end 42 of the stator component 22 includes a radially inwardly directed annular flange 44 whose inner peripheral portion is radially inwardly lapped over the inner end 46 of the rotor component 24, the end face of the inner end 46 and the opposing face of the annular flange 44 being disposed normal to the coinciding center axes of the stator and rotor components 22 and 24.

The outer periphery of the stator component 22 includes a circumferential groove 48 in which an O-ring seal 50 is disposed and the outer periphery of the rotor component 24 includes a pair of circumferential grooves 50 in which a pair of O-ring seals 52 are disposed.

The seal assembly 20 also includes a shroud or outer cover 54 consisting an outer annular end wall 56 whose outer peripheral portion supports an inwardly directed cylindrical wall 58. The axial end of the cylindrical wall 58 remote from the outer annular end wall 56 includes an inwardly directed lip 60 and the inner surface of the annular end wall 56 radially inwardly overlaps the outer end 62 of the rotor component 24, the inner surface of the outer end wall 56 and the outer end surface of the rotor component 24 being disposed normal to the coinciding longitudinal center axes of the stator and rotor components 22 and 24.

The outer periphery of the outer end 62 of the stator component 22 includes a diametrically reduced portion 64 in which a circumferential groove 66 is formed.

Figure 2:
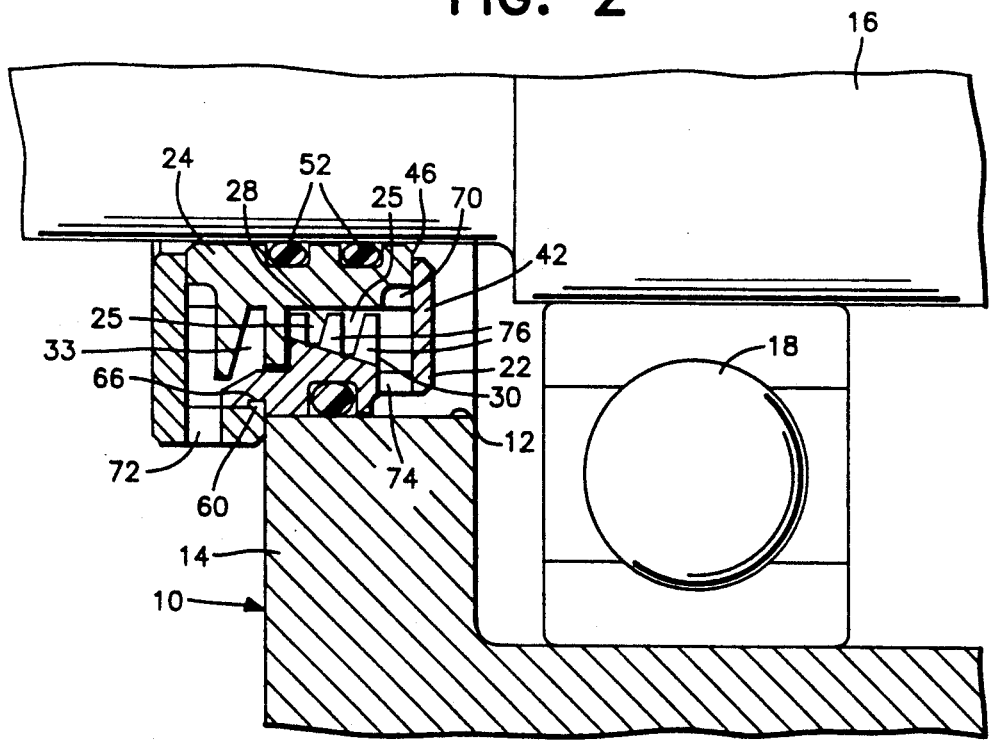
FIG. 2 is a fragmentary vertical sectional view illustrating the lower half of the seal of the instant invention in the same environment illustrated in FIG. 1, but illustrating the seal in operative association with straight shaft portion as opposed to a stepped shaft portion.

The shroud or outer cover 54 is assembled relative to the stator and rotor components 22 and 24 in the manner illustrated in FIGS. 1 and 2 of the drawings with the lip 60 seated in the circumferential groove 66. Further, a shoulder 68 is defined at the inner extremity of the diametrically reduced portion 64 and the end of the cylindrical wall 5 remote from the annular end wall 56 abuts up against the shoulder 68 to thereby properly axially position the shield or outer cover 54 relative to the stator component 22. Thus, the annular outer end wall 56 and the annular flange 44 define a predetermined spacing therebetween in which the rotor component 24 is snugly received such that the opposite axial ends of the rotary component 24 at least substantially actually contact the inner surfaces of the outer end wall 56 and the annular flange 44. Also, the axial positioning of the shield or outer cover 54 relative to the stator component 22 further maintains the gap spacing 40 between the fins 26 and 34 at an absolute minimum.

The inner peripheries of the opposite ends of the rotor component 24 include substantially half moon shaped recesses 70 formed therein at points spaced circumferentially thereabout. The recesses 70 in the outer end of the rotor component 24 serves to wipe any contaminants which may enter between the annular end wall 56 and the outer end of the rotor component 24 from the inner surface of the annular end wall 56 and, by gravity, to sling such contaminants to the internal area intersection juncture between the annular end wall 56 and the cylindrical wall 58, the lower periphery of the cylindrical wall 58 immediately inward of the annular end wall 56 being provided with a drain opening 72, see FIG. 2. In addition, the lower periphery of the stator component 22 includes a drain opening 74 at the inner end 42 of the stator component 22 and the recesses 70 carried by the inner end of the rotor component 24 serve to wipe any contaminants flowing downwardly along the inner surface of the annular flange 44 from the latter and to sling such contaminants downwardly toward the opening 74.

The lower peripheries of the fins 26, 28 and 30 include registered passages 76 formed therethrough and any liquid or other contaminants collecting between the lower peripheries of the fins 26, 28 and 30 flow through the passages 76 directly to the opening 74 and back into the interior of the housing portion 14.

Figure 3:
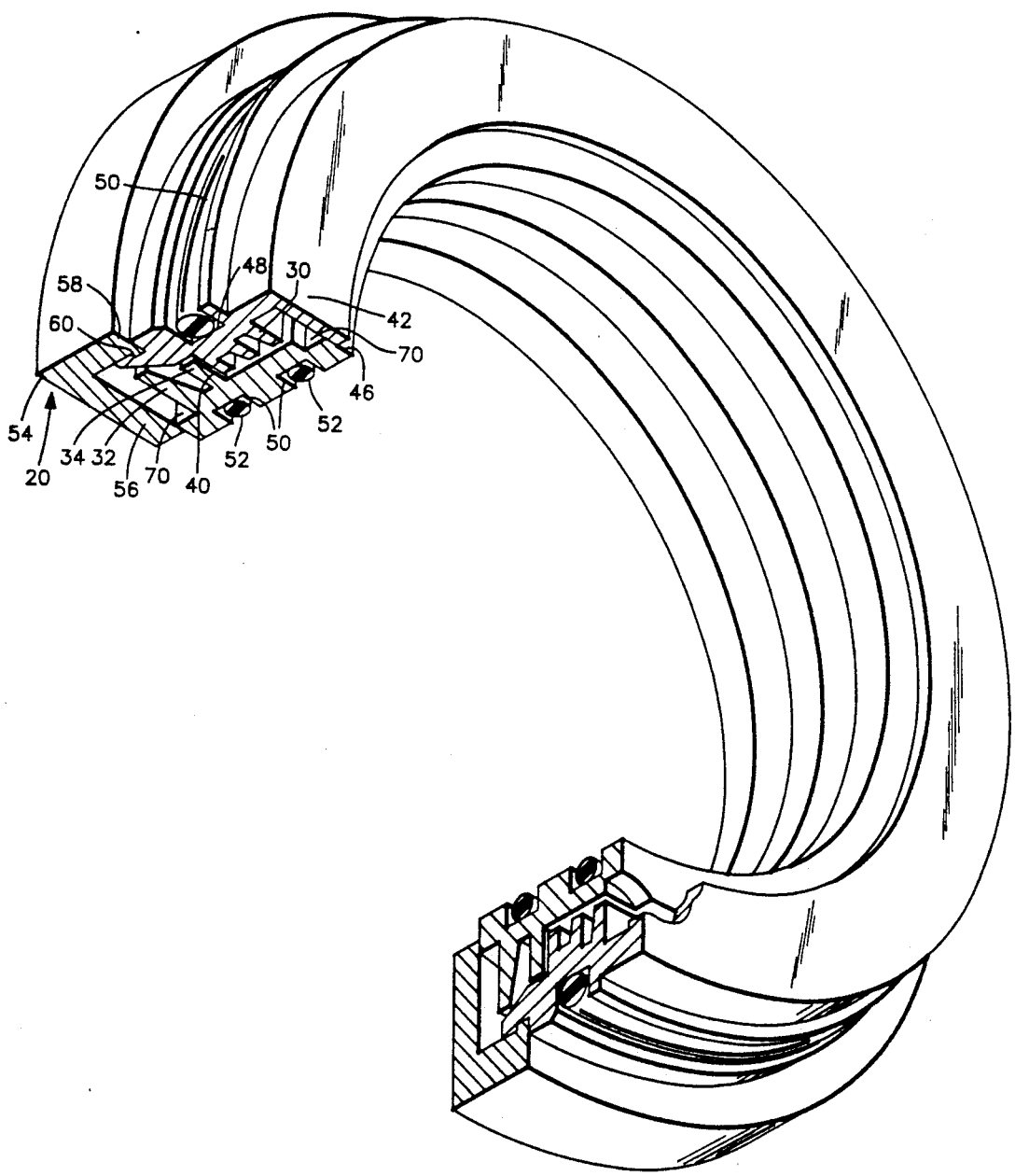
FIG. 3 is a perspective view of the seal of the instant invention with the lower left quadrant of the seal cut away and portions of the seal being illustrated in section.

It is pointed out that the radial extent of the lip 60 and the groove 66 is exaggerated in FIGS. 1, 2 and 3. In actuality, the radial extent thereof may be on the order of 0.003 inches and the outside diameter of the diametrically reduced portion 64 may be substantially the same as the inside diameter of the cylindrical wall 58.

In order to assemble the components of the seal 20, the preassembled stator and rotor components 22 may be disposed horizontally upon a horizontal surface with the annular flange 44 lowermost. Then, the shroud or outer cover 54 is heated in order to expand the latter and is dropped down over the diametrically reduced portion 64 into contact with the shoulder 68, cooling of the shroud or outer cover 54 then tightly seating the lip 60 within the groove 66 and also the inner surface of the cylindrical wall 58 against the diametrically reduced portion 64. Of course, this interfit between the stator component 22 and the shield or outer cover 54 forms a further seal against contaminants entering the internal areas of the seal assembly 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a housing including a wall portion having a shaft opening formed therethrough and a shaft journaled from said housing including one end loosely extending through said opening, a bearing protector, said protector including relatively rotatable inner and outer annular stator and rotor components, said stator and rotor components including radially overlapped and axially spaced radially inwardly and radially outwardly directed, respectively, circumferential fins defining a gap seal therebetween, said stator component including an outer periphery press fit in said opening and further including first outer circumferential seal means adapted to establish a fluid tight seal with said opening, said rotor component including an inner periphery adapted for at least snug fit on said shaft and further including second inner circumferential seal means adapted to establish a fluid tight seal with said shaft, said first and second seal means both being disposed between the opposite axial ends of said opening and said stator and said stator and rotor having major portions of the axial length thereof disposed between the opposite axial ends of said opening, said stator and rotor components including inner and outer ends, said radially inwardly directed fin being disposed inwardly of said radially inwardly directed fin, said inner end of said stator component including an inwardly directed annular flange radially inwardly lapped over the inner end of said rotor component, said stator component outer periphery, adjacent the outer end of said stator component, projecting outwardly of said opening and defining an outer cylindrical seat surface, a shroud including an annular outer wall, the outer peripheral portion of said outer wall including a cylindrical axial extension, said cylindrical extension including an inner cylindrical seat surface pressed fit axially over said cylindrical seat surface with said outer end wall at least substantially abutted against said outer axial end of said rotor component, said stator component including at least one additional radially inwardly projecting circumferential fin spaced axially inwardly of the first mentioned radially inwardly projecting fin of said stator component and defining a radially outwardly tapering V-shaped void between said radially inwardly projecting fins, and said additional fin including a passageway therethrough extending axially of said stator component and disposed in said radial plane.

2. The combination of claim 1 wherein said outer cylindrical seat surface is defined by a diametrically reduced portion of the outer periphery of the outer end portion of said stator defining an outwardly facing shoulder, the end of said cylindrical axial extension remote from said annular outer wall being abutted against said shoulder.

3. The combination of claim 2 wherein said outer cylindrical seat surface includes a shallow circumferential groove formed therein immediately outwardly of said shoulder, said end of said cylindrical extension remote from said annular outer wall including a radially inturned lip seated in said shallow circumferential groove.

4. The combination of claim 1 wherein one lower peripheral portion of said cylindrical axial extension, adjacent said annular outer wall, has a drain opening therethrough, said inner end of said stator component including a lower peripheral generally radial drain opening formed therethrough disposed in a radial plane of said bearing protector also including said shroud drain opening.

5. The bearing protector of claim 4 wherein said outer cylindrical seat surface is defined by a diametrically reduced portion of the outer periphery of the outer end portion of said stator defining an outwardly facing shoulder, the end of said cylindrical axially extension remote from said annular outer wall being abutted against said shoulder.

6. The bearing protector of claim 5 wherein said outer cylindrical seat surface includes a shallow circumferential groove formed therein immediately outwardly of said shoulder, said end of said cylindrical extension remote from said annular outer wall including a radially inturned lip seated in said shallow circumferential groove.

7. The combination of claim 1 wherein said rotor component includes at least one additional radially outwardly projecting circumferential fin spaced axially outwardly of the first mentioned radial fin of said rotor component and defining a radially inwardly tapering V-shaped void between said rotor fins.

8. The combination of claim 1 wherein inner and outer ends of said rotor components are generally cylindrical and are snugly received between said annular flange and said outer annular end wall, said inner and outer ends of said rotor component including radially outwardly opening recesses formed therein opening through the end faces of said inner and outer ends.

* * * * *